June 7, 1966  H. C. HARDY  3,254,739
METHOD AND APPARATUS FOR MEASURING THE SOUND ABSORPTION
OF ACOUSTICAL MATERIALS
Filed Oct. 15, 1962
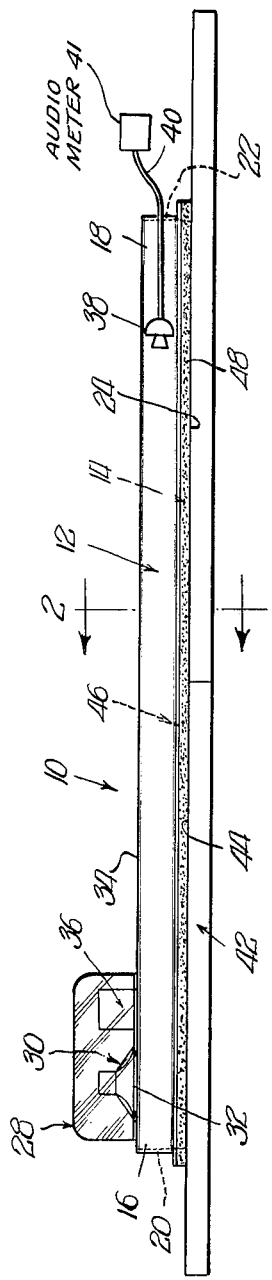
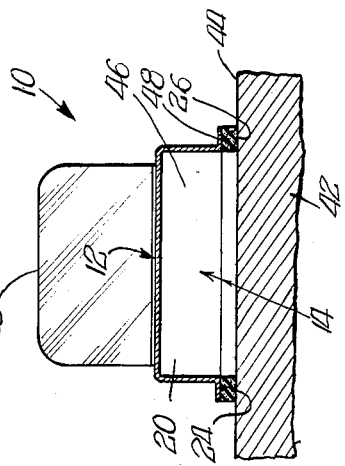
INVENTOR.
Howard C. Hardy,
BY

United States Patent Office 3,254,739
Patented June 7, 1966

---

3,254,739
METHOD AND APPARATUS FOR MEASURING THE SOUND ABSORPTION OF ACOUSTICAL MATERIALS
Howard C. Hardy, 463 N. La Porte Ave., Northlake, Ill.
Filed Oct. 15, 1962, Ser. No. 230,498
8 Claims. (Cl. 181—.5)

This invention relates to acoustical absorption of materials and more particularly, to a method and apparatus for measuring the sound absorption of acoustical materials.

The invention consists in the method of measuring the sound absorption of an acoustical material which comprises the steps of introducing a source of sound close to the surface of the material to be tested, causing the sound to travel along the surface and in such close relation thereto as to graze the surface over an extended distance, and analyzing the amount of acoustical energy absorbed by such surface.

The invention also consists in apparatus for measuring the absorption of an acoustical material comprising means for defining in combination with the surface of the material to be tested an elongated shallow duct, a sound source at one end of said duct, and sound measuring means at the other end of said duct.

The acoustical absorption of materials is usually measured in a large reverberation room by measuring the decay of sound over a period of time with and without sample. According to this known method, which is called the random incidence test, an effort is made to have the sound strike a sample of the material being tested randomly from all angles of incidence. It has been found that such a test requires setting up a sample of large area in the reference laboratory, and the technique, thus, can only be applied to a limited extent and with expensive procedures when it is desired to make such measurements outside of the laboratory and in the field.

Other known methods of measuring the absorption of acoustical materials have involved the use of an acoustic tube. In this method, an open end of the tube is placed against the sample of the material to be tested, and sound is directed at an angle normal to the surface of the sample in order to measure the reflective impedance of the surface. However, it has been found experimentally that this test does not correlate well with the random incidence test, because a large amount of absorbing efficiency of certain acoustical materials is obtained at angles which differ materially from normal, which results cannot be measured by the acoustic tube method.

Another requirement for accuracy in the acoustic tube is that it should have no sound leakage through the walls of the tube as well as no sound leakage at the periphery of the face of the sample. As a result, it has been found that not only has apparatus necessary for field measurement been very cumbersome, but also the requirement for an airtight seal has often resulted in disfiguring the face of the material to be tested.

Accordingly, it is an object of this invention to provide a method and apparatus for measuring the sound absorption of acoustical materials which overcome the described limitations of the known art by its simplicity of operation and construction, thereby resulting in economies in manufacturing the apparatus and suitability for field acoustical testing.

Other objects and advantages will appear in the following description with reference to the accompanying drawings, in which:

FIG. 1 is a side elevational view of my improved apparatus.

FIG. 2 is a cross sectional view on the line 2—2 of FIG. 1.

Referring now to the drawing forming part of this application and wherein like reference characters indicate like parts, the acoustical testing apparatus, indicated generally at 10, comprises an elongated narrow rectangular shell 12 having a narrow mouth-like orifice or trench 14 extending substantially the length of the shell 12 and closed at each end 16, 18 of the shell by suitable end walls 20, 22 which may be integral with the shell 12. The orifice 14 is defined longitudinally of the apparatus 10 by the side and end walls of the shell 12, whereby an elongated hollow shallow chamber or orifice is formed.

At one end 16 of the shell 12, there is mounted a housing 28 containing a suitable sound amplifier, such as the loudspeaker 30, which is connected to the narrow orifice 14 by means of an opening 32 in the top wall 34 of the shell 12. The loudspeaker 30 may be driven by a suitable sound source 36 of electronic energy which presents broad-band noise by means of the loudspeaker 30 to the orifice 14 either in frequency bands or a continuous spectrum over the complete range of frequencies. The electronic sound source 36 may be mounted to the housing 28 or may be external thereto and introduced by any known means.

Adjacent the other end 18 of the shell 12, there is mounted suitable means for measuring sound such as the microphone 38 which is connected by any suitable means such as the connection 40 to suitable supplementary audio measurement equipment for analysis of the sound in frequency bands and ultimate indication on a suitable meter 41. The loudspeaker 30 and its sound source 36 as well as the microphone 38 are resiliently hung in the apparatus so that there is no appreciable energy transmitted through the structure walls.

The acoustical material to be measured is shown generally at 42. This material may be a table, a wall, a ceiling, or whatever is to be tested for sound absorption. The apparatus 10 is placed against a surface 44 of the material 42 in such a manner that the lips 24, 26 of the shell 12 closely engage the surface 44, thereby defining, with the included portion of said surface, a shallow, closed duct 46 along the orifice 14 between the shell 12 and the surface 44 of the acoustical material 42 to be measured, with the duct 46 extending longitudinally of the apparatus 10 the entire length of the orifice 14 and encompassing the loudspeaker 30 and the microphone 38.

In order not to deface the surface of the sample, the lips 24, 26 of the shell 12 may include resilient gaskets 48 which may be constructed of any suitable material such as soft natural or synthetic rubber.

It will thus be seen that sound introduced by the loudspeaker 30 travels along the surface 44 of the material 42 within the shallow duct 46 and is measured by the microphone 38. The amount of sound received by the microphone 38 has been found to vary according to the acoustical efficiency of the material 42. The calibration of the instruments used to read the amount of sound absorption by the material to be tested is determined by reference to laboratory data measured in a reverberation chamber  It has been found, however, that for a wide range of materials one correlation curve will be sufficient.

In practice, the measurement is made by comparing the decibel reduction obtained with the sample of the acoustical material to be tested to the minimal decibel reduction obtained on essentially a non-absorptive surface, such as, for example, a wood table top or a hard concrete floor, and the difference in decibels in different frequency bands is compared to the performance of known materials.

It has been found that a model of the apparatus described and illustrated, suitable for field testing of acoustic materials, may be constructed with the shell 12 being made of sheet metal, or any other suitable material, having a width of four inches, and with the duct 46 in cross-section having a height above the surface 42 of approximately one inch. The distance between the loudspeaker 30 and the microphone 38 may be aproximately two feet, and the overall length of the device may be just under three feet.

The invention, however, is intended to cover all acoustical testing devices embodying the method of causing a sound to travel along the surface of the material to be tested in close relation to that surface so as to graze the surface over an extended distance before the amount of sound absorption by the material is measured.

In the specific embodiment described above, the sound source may be a transistorized electronic noise generator that operates between 200–5000 cycles per second. The sound analysis is made in half-octaves, although it is intended that the invention may be applied to even wider frequency limits and to analysis of octaves, third octaves, or even narrower bands, if so desired.

It has also been found that a small acoustical leak at the junction of the gasket 48 and the surface 42 is not entirely unfavorable, since such acoustical energy loss would be insignificant compared to the acoustical energy absorbed in the material 44 itself over the length of the duct 46 in all important cases.

Experiments with a model, having the geometry described, have shown that a ninety percent absorption by the sample material produces a twenty decibel decrease, which is quite adequate for any acoustical measurement. Materials with less than ninety percent absorption have been found to give proportionately less decibel decrease, so that a material which has only approximately ten percent absorption produces a one decibel drop.

The invention is intended to be used principally for evaluation of acoustical materials which are not prefabricated, such as, for example, acoustical plaster, porous asbestos sprayed-on materials, porous concrete block, and the like. The effect of painting such surfaces or the surfaces of acoustical tile can also be evaluated. The order of accuracy of the apparatus is somewhat less than a reference standard measurement, but has been found to be quite suitable for field testing.

The apparatus may, therefore, be used to determine the performance of contractors in ordinary building construction, or to monitor the performance of commercial acoustical material during manufacture. A portable apparatus operated completely on batteries may be used where 60-cycle current is not available.

I claim:

1. The method of measuring the sound absorption of an acoustical material which comprises the steps of creating an elongated shallow duct along the surface of the material to be tested, introducing a source of sound at one end of said duct, causing the sound to travel along the surface in such close relation to such surface as to graze the surface over an extended distance, and measuring the amount of acoustical energy absorbed by such surface at the other end of said duct.

2. Apparatus for measuring the sound absorption of an acoustical material comprising duct means for placing against a surface of material to be tested and defining in combination with the included portion of said surface an elongated shallow duct, a sound source at one end of said duct, and sound measuring means at the other end of said duct.

3. Apparatus, according to claim 2, wherein said duct means includes an elongated shell having a narrow orifice extending substantially the length of said shell.

4. Apparatus, according to claim 2, wherein the ends of said duct are closed by closure means.

5. Apparatus, according to claim 2, wherein a housing is mounted on said duct means adjacent said one end, with said sound source being mounted in said housing.

6. Apparatus, according to claim 2, wherein said sound source includes a loudspeaker and said sound measuring means includes a microphone, both being mounted in said duct in spaced relation to each other.

7. Apparatus for measuring the sound absorption of an acoustical material comprising an elongated shell having a narrow orifice extending substantially the length of said shell defining in combination with the included portion of the surface of the material to be tested on elongated shallow duct, a sound source at one end of said duct, sound measuring means at the other end of said duct, said shell including spaced elongated sides having edges extending longitudinally along said orifice for close engagement with said surface, and gasket means along said edges for effecting a nominal seal between said edges and the surface to be tested.

8. Apparatus for measuring the sound absorption of an acoustical material, comprising an elongated narrow shallow shell having an orifice extending the length of the shell and defined by the walls of said shell, said shell adapted to be placed against a surface of material to be tested, and define, with the included portion of said surface, an elongated shallow duct, means at one end of said shell for introducing a sound of certain decibels, and means at the other end of said shell for measuring the acoustical energy absorbed by said surface.

References Cited by the Examiner

UNITED STATES PATENTS 1,766,103   6/1930   Burgess _____ 181—0.5 X

BENJAMIN A. BORCHELT, *Primary Examiner.*

CHESTER L. JUSTUS, *Examiner.*

T. H. TUBBESING, *Assistant Examiner.*